US010382110B2

United States Patent
Seifi et al.

(10) Patent No.: US 10,382,110 B2
(45) Date of Patent: Aug. 13, 2019

(54) ADAPTIVE USER-SPECIFIC BEAM FORMING

(71) Applicant: TELEFONAKTIEBOLAGET LM ERICSSON (PUBL), Stockholm (SE)

(72) Inventors: Nima Seifi, Solna (SE); Niklas Jaldén, Enköping (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/554,655

(22) PCT Filed: Mar. 11, 2015

(86) PCT No.: PCT/EP2015/055085
§ 371 (c)(1),
(2) Date: Aug. 30, 2017

(87) PCT Pub. No.: WO2016/141987
PCT Pub. Date: Sep. 15, 2016

(65) Prior Publication Data
US 2018/0041260 A1  Feb. 8, 2018

(51) Int. Cl.
*H04B 7/04* (2017.01)
*H04B 7/06* (2006.01)
(Continued)

(52) U.S. Cl.
CPC ......... *H04B 7/0617* (2013.01); *H04B 7/0469* (2013.01); *H04B 7/0482* (2013.01); *H04L 5/0051* (2013.01)

(58) Field of Classification Search
CPC . H01Q 21/06; H04B 7/02; H04B 7/04; H04B 7/06; H04B 7/0456; H04B 7/0482;
(Continued)

(56) References Cited

U.S. PATENT DOCUMENTS

2011/0255434 A1\* 10/2011 Ylitalo ................ H01Q 1/246
370/252
2013/0235807 A1\* 9/2013 Lee ...................... H04W 16/28
370/329
(Continued)

FOREIGN PATENT DOCUMENTS

WO    2013152490 A1    10/2013

OTHER PUBLICATIONS

International Search Report and Written Opinion dated Nov. 19, 2015, in International Application No. PCT/EP2015/055085, 10 pages.
(Continued)

*Primary Examiner* — Shawkat M Ali
(74) *Attorney, Agent, or Firm* — Rothwell, Figg, Ernst & Manbeck, P.C.

(57) ABSTRACT

There is provided mechanisms for adaptive user-specific beam forming. A method is performed by a network node. The method comprises acquiring uplink user-specific spatial channel characteristics for a wireless device. The method comprises acquiring a set of downlink port mappings for the wireless device. The method comprises adaptively configuring user-specific ports for the wireless device by using the uplink user-specific spatial channel statistics to determine a downlink user-specific port mapping from the set of downlink port mappings, thereby providing user-specific beam forming for the wireless device.

20 Claims, 5 Drawing Sheets

(51) Int. Cl.
 *H04B 7/0456* (2017.01)
 *H04L 5/00* (2006.01)
(58) Field of Classification Search
 CPC ....... H04B 7/0617; H04L 5/00; H04L 5/0048;
   H04L 5/0051; H04L 12/28; H04W 4/00;
   H04W 4/08; H04W 16/28; H04W 24/00;
   H04W 56/00; H04W 72/04; H04W 88/02
 USPC ........ 370/328, 239, 252; 375/219, 267, 296;
   455/518
 See application file for complete search history.

(56) References Cited

U.S. PATENT DOCUMENTS

| | | | |
|---|---|---|---|
| 2014/0016549 A1* | 1/2014 | Novlan ................ | H04B 7/0417 370/328 |
| 2014/0177683 A1 | 6/2014 | Krishnamurthy et al. | |
| 2015/0003325 A1* | 1/2015 | Sajadieh ............... | H04W 76/10 370/328 |
| 2015/0146650 A1* | 5/2015 | Ko ....................... | H04B 7/0456 370/329 |
| 2016/0050002 A1* | 2/2016 | Wei ..................... | H04B 7/0469 370/329 |
| 2016/0149680 A1* | 5/2016 | Kang ................... | H04B 7/0417 370/329 |

OTHER PUBLICATIONS

European Communication dated Oct. 17, 2018, issued in European Patent Application No. 15710469.6, 6 pages.
European Communication dated Feb. 25, 2019, issued in European Patent Application No. 15710469.6, 5 pages.

\* cited by examiner

ADAPTIVE USER-SPECIFIC BEAM FORMING

CROSS REFERENCE TO RELATED APPLICATION(S)

This application is a 35 U.S.C. § 371 National Phase Entry Application from PCT/EP2015/055085, filed Mar. 11, 2015, designating the United States, the disclosure of which is incorporated herein in its entirety by reference.

TECHNICAL FIELD

Embodiments presented herein relate to beam forming, and particularly to a method, a network node, a computer program, and a computer program product for adaptive user-specific beam forming.

BACKGROUND

In communications networks, there may be a challenge to obtain good performance and capacity for a given communications protocol, its parameters and the physical environment in which the communications network is deployed.

For example, future generations wireless communications networks are expected to provide ubiquitous high data-rate coverage. Currently emerging standards, such as the 3rd Generation Partnership Project (3GPP) Long Term Evolutional Advanced (LTE-Advanced), are targeted to support up to 1 Gbps in the downlink (i.e., from the network nodes to the wireless devices) and 500 Mbps in the uplink (i.e., from the wireless devices to the network nodes). In general terms, achieving such data rates requires an efficient use of the available resources. With multiple antennas at the transmitter and/or the receiver (such as at the network node and/or the wireless devices), it is possible to exploit the spatial degrees of freedom offered by multipath fading inside the wireless channel between the transmitter and the receiver in order to provide an increase in the data rates and reliability of wireless transmission.

In conventional cellular networks, network nodes, such as radio base stations, are typically installed at a height significantly above the wireless devices, also referred to as user equipment (UE), to be served, and the cell radius (defining the border within which the network node provides coverage to the wireless devices) is much larger than the height difference between the transmitter and receiver nodes. In such situations, most of the multipath fading takes place in the azimuth plane of the wireless channel. Hence, a fixed antenna pattern is commonly employed in the elevation dimension.

In current wireless communications networks smaller cell sizes are becoming more common and the wireless devices may be distributed in both the azimuth and elevation domains, sometimes even above the height where the network nodes are placed. Therefore, the wireless propagation channel between the network node and each served wireless device becomes a truly three-dimensional (3D) propagation environment where the multipath fading occurs both in the azimuth and elevation domains.

With the emergence of active antenna systems (AAS), active transceivers (transmitters and receivers) are integrated with each, or a group (i.e., subarray) of, radiating elements inside the antenna radome. This enables adaptive weighting of individual antenna elements or subarrays using baseband processing. A two-dimensional (2D) planar active antenna array provides freedom in controlling radiation patterns in both the elevation and azimuth domains. This is different from legacy network node antennas that use horizontal linear arrays with a fixed radiation pattern in the elevation domain.

One example of 2D spatial processing capability of an AAS is to perform user-specific 2D beamforming. In this approach the antenna array at the network node adaptively controls individual beams in the elevation and/or azimuth planes to match the propagation channel of the wireless device of interest. User-specific 2D beamforming may enhance link throughput and extend both downlink and uplink coverage.

A linear antenna is suitable when user-specific beamforming is to be performed in one dimension only. However, some wireless devices may benefit from beamforming in azimuth whereas other wireless devices may benefit from beamforming in elevation.

In general terms, proper selection of beamforming weights in the network node based on feedback from the wireless device is a matter of not only the number of downlink reference signals and the codebook which is used for evaluation and/or basis for the feedback information but also that there is a match between the antenna topology and the codebook design. The latter is typically the case for single column (or row) dual polarized antennas but typically not for two-dimensional antennas with beamforming capabilities in two dimensions.

Hence, there is still a need for an improved user-specific beam forming.

SUMMARY

An object of embodiments herein is to provide efficient user-specific beam forming.

According to a first aspect there is presented a method for adaptive user-specific beam forming. The method is performed by a network node. The method comprises acquiring uplink user-specific spatial channel characteristics for a wireless device. The method comprises acquiring a set of downlink port mappings for the wireless device. The method comprises adaptively configuring user-specific ports for the wireless device by using the uplink user-specific spatial channel statistics to determine a downlink user-specific port mapping from the set of downlink port mappings, thereby providing user-specific beam forming for the wireless device.

Advantageously this provides efficient user-specific beam forming.

Advantageously the provided user-specific beam forming matches the propagation channel of the wireless device, thereby improving the beamforming gain.

By exploiting uplink user-specific spatial channel characteristics of the channel, the user-specific beamforming can be performed using a reasonable number of user-specific ports. Therefore, there is no need for exhaustive sampling of the whole spatial channel by using a large number of user-specific signals, which incurs both signalling overhead and energy inefficiency.

According to a second aspect there is presented a network node for adaptive user-specific beam forming. The network node comprises a processing unit. The processing unit is configured to cause the network node to acquire uplink user-specific spatial channel characteristics for a wireless device. The processing unit is configured to cause the network node to acquire a set of downlink port mappings for the wireless device. The processing unit is configured to cause the network node to adaptively configure user-specific ports for the wireless device by using the uplink user-specific spatial channel statistics to determine a downlink user-specific port mapping from the set of downlink port mappings, thereby providing user-specific beam forming for the wireless device.

According to a third aspect there is presented a computer program for adaptive user-specific beam forming, the computer program comprising computer program code which, when run on a processing unit of a network node, causes the network node to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
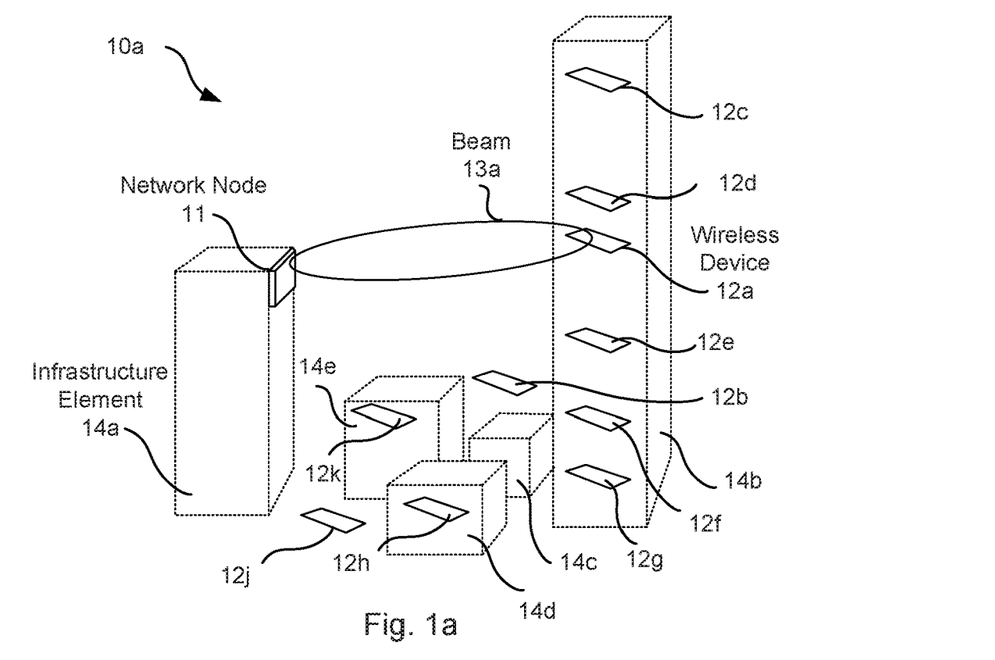
FIG. 1a is a schematic diagram illustrating a communication network according to prior art.

FIG. 1a is a schematic diagram (not to scale) illustrating a communications network 10a according to prior art. The communications network 10a comprises a network node 11. The network node 11 may be a radio access network node (such as a radio base station; a base transceiver station; a node B, an evolved node B, or the like). The network node 11 provides network connectivity to wireless devices 12a, 12b, 12c, 12d, 12e, 12f, 12g, 12h, 12j. The wireless devices 12a-12j may be any combination of portable wireless devices (such as mobile stations, mobile phones, handsets, wireless local loop phones, user equipment (UE), smartphones, laptop computers, tablet computers, modems, or the like). FIG. 1a further schematically illustrates infrastructure elements 14a, 14b, 14c, 14d, 14e, such as buildings on which the network node 11 may be mounted and in which the wireless devices 12a-12j may be located.

In order to provide network connectivity the network node 11 is configured to transmit signals to, and receive signals from, the wireless devices 12a-12j. In the example of FIG. 1a the network node 11 has established a fixed beam 13a towards wireless device 12a and wireless device 12a is thus served by the network node 11. The beam 13a may have a long term setting of beam tilt in the elevation domain and may only be capable of performing adaptive beamforming in the azimuth domain. In this scenario, wireless devices located in an elevation direction far from that of the beam 13a may experience a low antenna gain as they are far from the peak of the beam 13a.

Figure 1B:
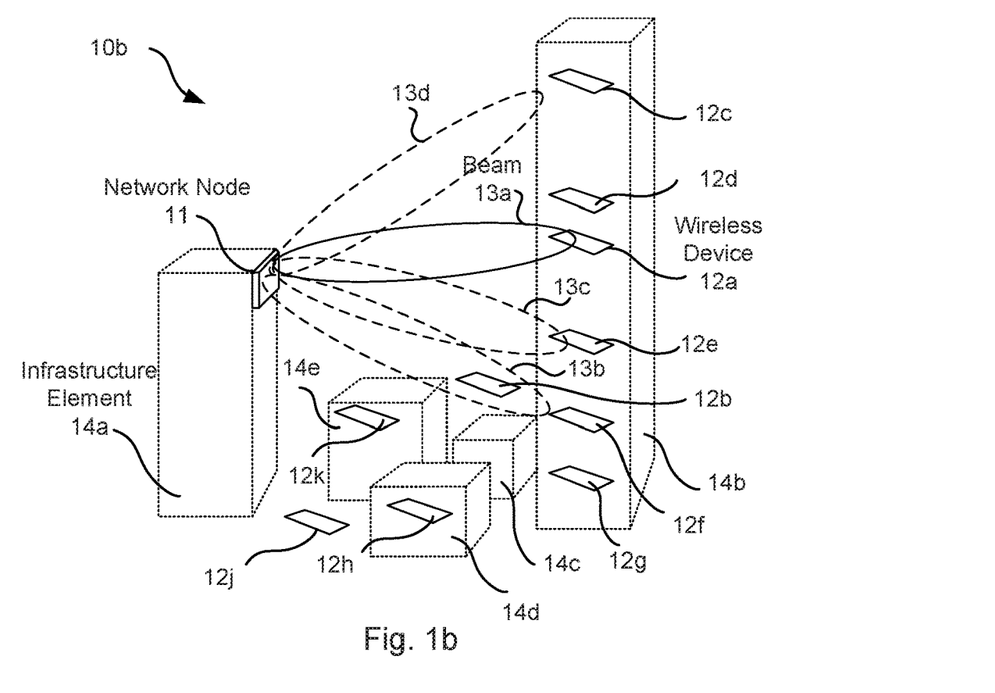
FIG. 1b is a schematic diagram illustrating a communication network according to embodiments.

With AAS it is possible to adaptively steer the beam 13a in the elevation domain towards the wireless devices 12a-12j, thereby improving the experienced throughput for these wireless devices 12a-12j. FIG. 1b is a schematic diagram illustrating a communications network 10b according to embodiments. The communications network 10b is similar to that of FIG. 1a, but the network node 11 is further configured for user-specific beamforming also in the elevation domain, e.g., by using AAS. In the illustrative example of FIG. 1b, dashed beams 13b, 13c, 13d indicate possible user-specific beams, while the solid beam 13a is the one currently used to serve the scheduled wireless device 12a.

The embodiments disclosed herein relate to adaptive user-specific beam forming. The adaptive user-specific beam forming may be used to determine the direction of the beams 13a-13d so as to serve at least some of the wireless devices 12a-12j.

In order to obtain adaptive user-specific beam forming there is provided a network node 11, a method performed by the network node 11, a computer program comprising code, for example in the form of a computer program product, that when run on a processing unit of the network node 11, causes the network node 11 to perform the method.

In wireless communications, channel state information (CSI) refers to knowledge about the propagation properties between the two ends of a communication link, such as between the network node 11 and a wireless device 12a-12j. In general, signal transmitted from different antennas at the transmitter will be subject to different radio channels. Hence, the wireless device 12a-12j may be configured to distinguish the radio channels to different antennas at the network node 11. For example, the wireless device 12a-12j may need to know what reference symbols to use to estimate the channel to a given network node antenna. The wireless device 12a-12j may need to estimate channel conditions when, for example, performing demodulation of data or for determining the CSI used for scheduling and link adaptation. For at least these reasons, in LTE the concept of "antenna port" has been introduced. Each individual downlink transmission is carried out from a specific antenna port whose identity should be known to the wireless device 12a-12j. To this end, each antenna port is associated with a unique common reference signal (CRS) that the wireless device 12a-12j uses to estimate the channel to that antenna port. The antenna port is an abstract concept that does not necessarily correspond to a physical antenna. In fact, in practice, usually a group of physical antenna elements are mapped to an antenna port. The physical antennas might also be weighted in order to focus the wavefront of the transmitted signal in a specific direction, denoted as virtualization, so as to perform beam forming. In this case, the single propagation channel between the antenna port of the network node 11 and the wireless device 12a-12j corresponds to the sum of the channels of the different physical antennas, including the radio propagation channel, antenna element gain, and any possible antenna virtualizations weight. This means that each antenna port is viewed as a single antenna at the wireless device side. For example, in LTE Release 8 and Release 9, there can be 1, 2, or 4 CRSs signals in each cell corresponding to 1, 2, or 4 antenna ports.

Figure 2A:
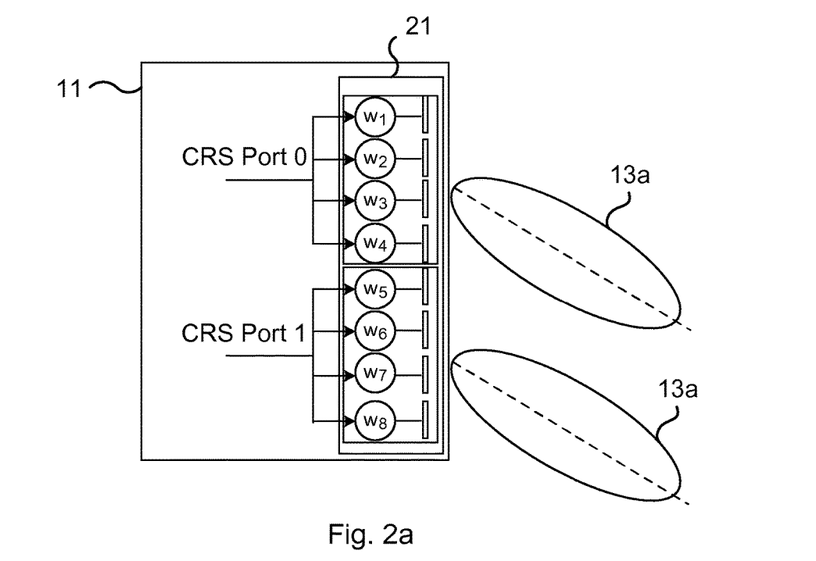
FIG. 2a is a schematic diagram showing an example of port-to-antenna mapping of a network node according to an embodiment.

FIG. 2a schematically illustrates an example of part of a network node 11 where eight physical antennas in an antenna array 21 of the network node 11 have been mapped into two vertically separated antenna ports denoted CRS Port 0, and CRS Port 1, respectively. Moreover, each of the four physical antennas at each port is virtualized by applying complex weights w1, w2, ..., w8, in order to direct the wavefront of the beams 13a into a specific direction. In fact, the number of physical antennas in each port, their relative positions, their patterns, and their applied weights determine an overall pattern for the antenna port, as defined by the beam 13a. This pattern defines the cell coverage and is common for all wireless devices 12a-12j in the cell. In some embodiments the antenna port used for CRS transmission may be denoted a CRS port.

In LTE Release 10, a new reference symbol sequence was introduced to acquire CSI, denoted as CSI reference symbol (CSI-RS). The CSI-RS provides several advantages for CSI acquisition over CRS which was used for the same purpose in previous releases. Firstly, the CSI-RS is not used for demodulation of the data signal, and thus does not need to be transmitted with the same density as CRS. Secondly, CSI-RS provides a more flexible means to perform user-specific CSI acquisition compared to CRS that is common for all wireless devices 12a-12j in the cell.

The support of antenna configurations larger than 4 antenna ports may resort to CSI-RS, since the CRS is only defined for at most 4 antenna ports. By being configured for measuring on a CSI-RS, a wireless device 12a-12j can estimate the effective channel the CSI-RS is traversing, including the radio propagation channel, antenna gains, and any possible antenna virtualizations.

Figure 2B:
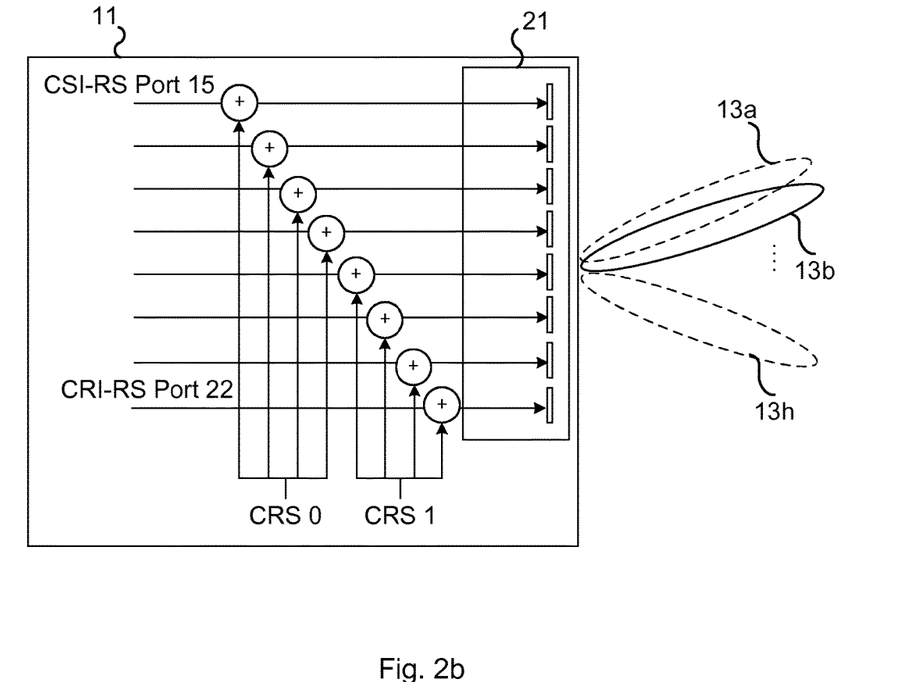
FIG. 2b is a schematic diagram showing a network node configured for user-specific beam forming according to an embodiment.

One approach to further improve the beamforming gain beyond what is achievable with CRS virtualization is to focus the transmitted wavefront towards a specific wireless device 12a-12j. This is denoted as user-specific beamforming. User-specific beamforming may be achieved by appropriately combining CSI-RS ports. FIG. 2b schematically illustrates an example of part of a network node 11 where eight CSI-RS signals (from CSI-RS Ports 15, 16, ..., 22) are transmitted, for example, in beams 13a, 13b, ..., 13h from an antenna array 21 directly over each antenna element (whereas the CRS signals, as in the example of FIG. 2a, are applied after some proper weighting to get the desired beamshape).

As will be further disclosed below, the network node 11 can here, based on feedback from a wireless devices 12a who may evaluate possible combinations of CSI-RS ports based on a codebook, select a beam that efficiently serves the wireless devices 12a, for example by maximizing path gain. As will also be further disclosed below, at least some of the herein disclosed embodiments concern adaptive user-specific beamforming by appropriate configurations of the downlink user-specific port mapping in order to improves the user-specific beamforming gain and hence the overall system performance.

Figure 3A:
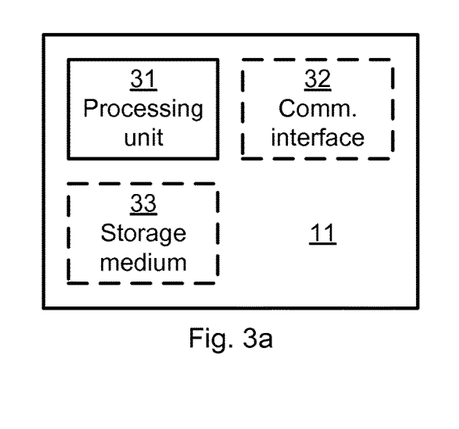
FIG. 3a is a schematic diagram showing functional units of a network node according to an embodiment.

FIG. 3a schematically illustrates, in terms of a number of functional units, the components of a network node 11 according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41 (as in FIG. 4), e.g. in the form of a storage medium 33. Thus the processing unit 31 is thereby arranged to execute methods as herein disclosed. The storage medium 33 may also comprise persistent storage, which, for example, can be any single one or combination of magnetic memory, optical memory, solid state memory or even remotely mounted memory. The network node 11 may further comprise a communications interface 32 for communications with at least one wireless device 12a, 12b and with a core network. As such the communications interface 22 may comprise one or more transmitters and receivers, comprising analogue and digital components and a suitable number of antennas for wireless communications and ports for wireline communications. The processing unit 31 controls the general operation of the network node 11 e.g. by sending data and control signals to the communications interface 32 and the storage medium 33, by receiving data and reports from the communications interface 32, and by retrieving data and instructions from the storage medium 33. Other components, as well as the related functionality, of the network node 11 are omitted in order not to obscure the concepts presented herein.

Figure 3B:
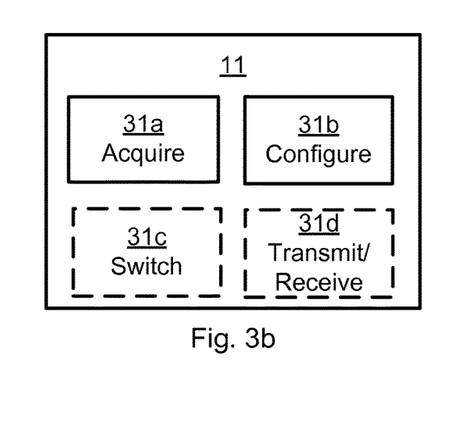
FIG. 3b is a schematic diagram showing functional modules of a network node according to an embodiment.

FIG. 3b schematically illustrates, in terms of a number of functional modules, the components of a network node 11 according to an embodiment. The network node 11 of FIG. 3b comprises a number of functional modules; an acquire module 31a configured to perform below steps S102, S102a, S104, and a configure module 31b configured to perform below steps S106, S106a. The network node 11 of FIG. 3b may further comprises a number of optional functional modules, such as a switch module 31c configured to perform below step S106b, and a transmit and/or receive module 31d configured to perform below step S108. The functionality of each functional module 31a-d will be further disclosed below in the context of which the functional modules 31a-d may be used. In general terms, each functional module 31a-d may be implemented in hardware or in software. Preferably, one or more or all functional modules 31a-d may be implemented by the processing unit 31, possibly in cooperation with functional units 32 and/or 33. The processing unit 31 may thus be arranged to from the storage medium 33 fetch instructions as provided by a functional module 31*a-c* and to execute these instructions, thereby performing any steps as will be disclosed hereinafter.

Figure 4:
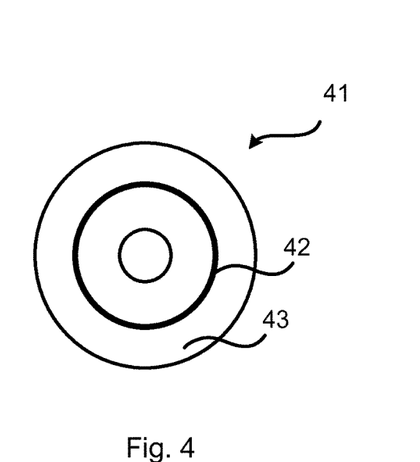
FIG. 4 shows one example of a computer program product comprising computer readable means according to an embodiment.

FIG. 4 shows one example of a computer program product 41 comprising computer readable means 43. On this computer readable means 43, a computer program 42 can be stored, which computer program 42 can cause the processing unit 31 and thereto operatively coupled entities and devices, such as the communications interface 32 and the storage medium 33, to execute methods according to embodiments described herein. The computer program 42 and/or computer program product 41 may thus provide means for performing any steps as herein disclosed.

In the example of FIG. 4, the computer program product 41 is illustrated as an optical disc, such as a CD (compact disc) or a DVD (digital versatile disc) or a Blu-Ray disc. The computer program product 41 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 42 is here schematically shown as a track on the depicted optical disk, the computer program 42 can be stored in any way which is suitable for the computer program product 41.

Figure 5:
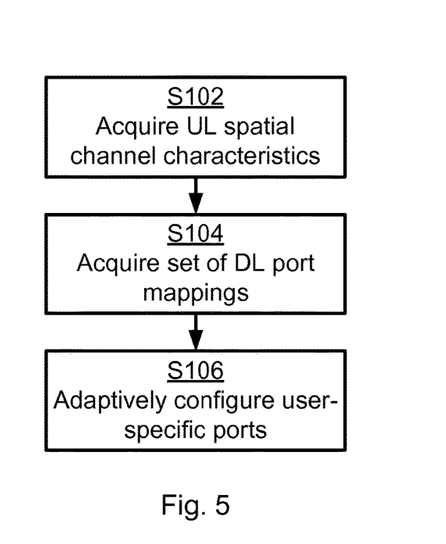
FIGS. 5 and 6 are flowcharts of methods according to embodiments.
Figure 6:
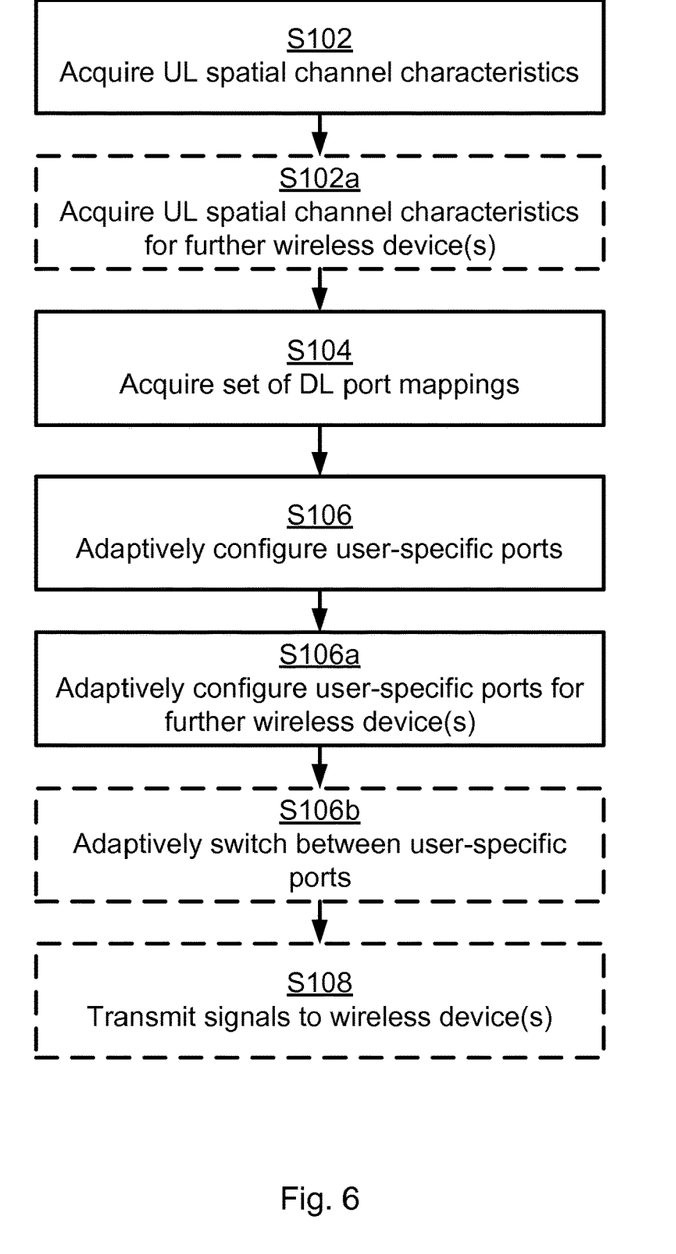

FIGS. 5 and 6 are flow chart illustrating embodiments of methods for adaptive user-specific beam forming. The methods are performed by the network node 11. The methods are advantageously provided as computer programs 42.

Reference is now made to FIG. 5 illustrating a method for adaptive user-specific beam forming as performed by the network node 11 according to an embodiment.

The adaptive user-specific beam forming is based on statistics of at least one wireless device. Hence the network node 11 is configured to, in a step S102, acquire uplink user-specific spatial channel characteristics for a wireless device 12*a*. Different examples of such uplink user-specific spatial channel characteristics and how the network node 11 may acquire it will be provided below.

The network node 11 is further configured to, in a step S104, acquire a set of downlink port mappings for the wireless device 12*a*. Different examples of how the set of downlink port mappings may be defined will be provided below.

The network node 11 is further configured to, in a step S106, adaptively configure user-specific ports for the wireless device 12*a* by using the uplink user-specific spatial channel statistics. Particularly, the uplink user-specific spatial channel statistics are used to determine a downlink user-specific port mapping from the set of downlink port mappings. User-specific beam forming for the wireless device 12*a* is thereby provided.

Embodiments relating to further details of adaptive user-specific beam forming as performed by the network node 11 will now be disclosed.

There may be different examples of spatial channel characteristics. Different embodiments relating thereto will now be described in turn.

According to an embodiment the spatial channel characteristics are long-term channel statistics.

According to an embodiment the spatial channel characteristics relate to a direction of arrival for radio waves received by the network node 11 channel correlation or covariance matrices determined from uplink measurements, signal strength estimates over multiple antenna elements or beam forms, or any combination thereof.

According to an embodiment the spatial channel characteristics represent measurements on received signals at network node 11, for example sounding reference signals (SRS), or the like.

As noted above, the spatial channel characteristics may relate to covariance matrices determined from uplink measurements Particularly, denote the spatial channel characteristics for wireless device k by a covariance matrix, $R_k$. The covariance matrices for each wireless device can be measured using e.g., SRS. Further properties of $R_k$ and how $R_k$ may be used will be disclosed below.

These embodiments may be readily combined; for example, the spatial channel characteristics in $R_k$ may be long-term channel statistics relating to a direction of arrival for radio waves received by the network node 11, wherein the spatial channel characteristics represent measurements on received signals.

The uplink user-specific spatial channel characteristics may be acquired directly from the wireless device 12*a*, retrieved from the storage medium 33, or received from another network node.

There may be different examples of how to provide the user-specific ports. Different embodiments relating thereto will now be described in turn.

According to an embodiment the user-specific ports are ports of an active antenna array. According to an embodiment the downlink user-specific port mapping is defined by dividing the active antenna array into at least two subarrays. Examples of how to divide the active antenna array into at least two subarrays will be provided below.

According to an embodiment the user-specific ports are used for transmitting user-specific reference signals, for example CSI-RS signals. Hence, the user-specific ports may be CSI-RS ports. According to an embodiment characteristics of the user-specific ports are adaptively configured to perform the user-specific beam forming. Examples of such characteristics include, but are no limited to, positions of the user-specific ports in the antenna array and polarization with respect to other ports in the antenna array.

There may be different ways to use the downlink user-specific port mapping. Different embodiments relating thereto will now be described in turn. For example, the downlink user-specific port mapping may be used for user-specific beam forming in horizontal direction. Hence, according to an embodiment the downlink user-specific port mapping is used for user-specific beam forming in horizontal direction when the spatial channel characteristics are more favorable in the horizontal direction than that in vertical direction. For example, the downlink user-specific port mapping may be used for user-specific beam forming in vertical direction. Hence, according to an embodiment the downlink user-specific port mapping is used for user-specific beam forming in vertical direction when the spatial channel characteristics are more favorable in the vertical direction than that in horizontal direction.

Reference is now made to FIG. 6 illustrating methods for adaptive user-specific beam forming as performed by the network node 11 according to further embodiments.

There may be different ways to implement the user-specific ports. Different embodiments relating thereto will now be described in turn. According to an embodiment the user-specific ports are implemented by combining at least two subarrays ports. In more detail, the user-specific ports can be implemented by combining the at least two subarrays ports in a way to use all radio chains, for example to explore all power amplifier resources.

Figure 7A:
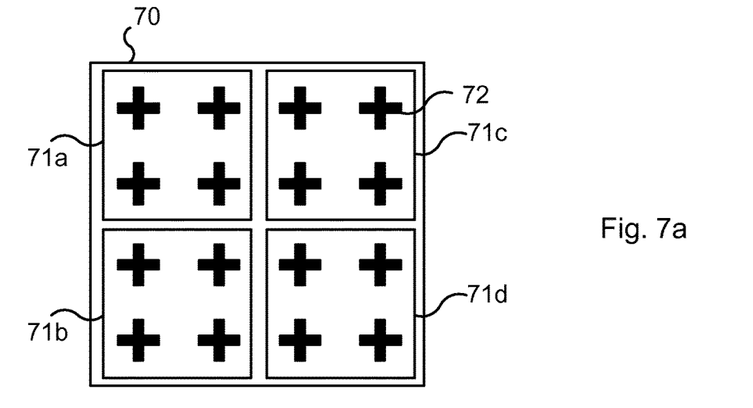
FIGS. 7a, 7b, and 7c schematically illustrate subarrays and port configurations according to embodiments.

Consider the illustrative example in FIG. 7a of a 4-by-4 planar antenna array 70 with dual polarized antenna elements 72. The antenna elements 72 are grouped into subarrays 71a, 71b, 71c, 71d, where each subarray consists of 2-by-2 dual polarized antenna elements. The antenna elements within a subarray 71a, 71b, 71c, 71d can be configured to have desired beamwidth and polarization properties. Given that all subarrays are to have the same power patterns, 8 antenna ports, two orthogonal polarization per subarray, can be formed. From this set of eight antenna ports subsets as well as combinations of ports can be selected to define the user-specific ports.

Figure 7B:
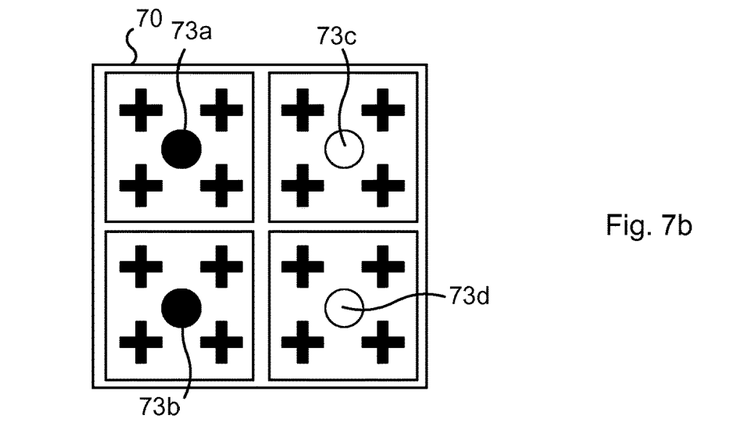
Figure 7C:
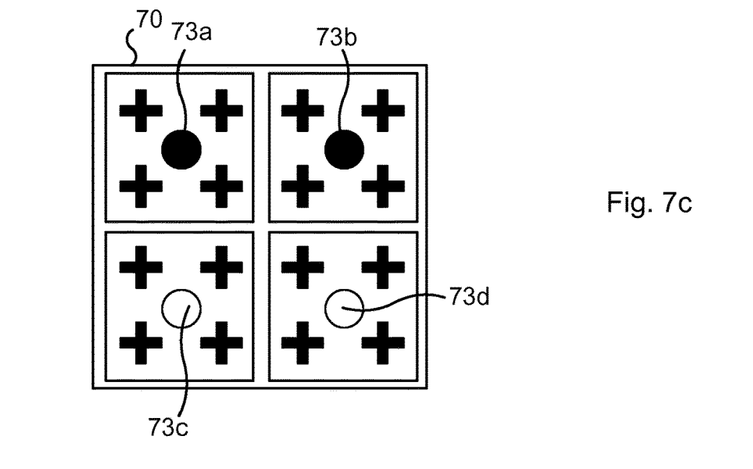

Two target configurations for the illustrative example of FIG. 7a are shown in FIGS. 7b and 7c, respectively, where examples of user-specific ports are identified at 73a, 73b, 73c, and 73d. In FIG. 7b is shown an example where the two leftmost subarrays, vertically separated, are configured to have a first polarization A and the two rightmost subarrays have the orthogonal polarization B. With this port configuration, user-specific beamforming takes place in the vertical dimension. The circles (filled or not filled) at 73a, 73b, 73c, and 73d denote the polarization associated with the port. Another example where port mappings allow for beamforming along the horizontal dimension is shown in FIG. 7c. The configurations in FIGS. 7b and 7c can be seen as a uniform linear array (ULA) with two ports per polarization. The codebooks in 3GPP used for precoder selection applies directly for these types of antenna configuration.

There may be different ways to determine whether user-specific beamforming is to take place in the vertical dimension or in the horizontal dimension. Different embodiments relating thereto will now be described in turn.

Let $R_k^h$ and $R_k^v$ denote the covariance matrix for the channel between wireless device k and any of the two horizontal and vertical pairs of user-specific ports, e.g., either pair (73a, 73b) or pair (73c, 73d) in FIGS. 7b and 7d.

Adaptively configuring the user-specific ports, as in step S106, may then comprise determining codebook entry specifying beam forming weights $f_h$ for horizontal user-specific beam forming, and a codebook entry specifying beam forming weights $f_v$ for vertical user-specific beam forming. The beam forming weights $f_h$ and $f_v$ may be determined so as to maximize signal strength expressed as $f_h^H R_k^h f_h$ and $f_v^H R_k^v f_v$, respectively.

For example, let $\Omega_h$ and $\Omega_v$ denote codebooks containing respectively the beamforming weights for horizontal and vertical user-specific beamforming. In general terms, the vertical codebook may be equal to the horizontal codebook, i.e., $\Omega_v = \Omega_H$ and hence a single codebook may be used. To enable user-specific beamforming in the azimuth or elevation domain to wireless device k, the network node 11 may determines $f_h$ and $f_v$ as $$f_v = \operatorname*{argmax}_{f \in \Omega_V} f^H R_k^v f$$

$$f_h = \operatorname*{argmax}_{f \in \Omega_H} f^H R_k^h f$$

Hence, the beam forming weights $f_h$ and $f_v$ may be determined as the beam forming weights selected from all possible beam forming weights in the codebooks $\Omega_h$ and $\Omega_v$ that maximize $f^H R_k^v f$ and $f^H R_k^h f$, respectively The network node 11 may then use these results as input when selecting which user-specific port configuration to use for the specific wireless device 12a. Hence, according to an embodiment, adaptively configuring user-specific ports, as in step S106 comprises selecting a user-specific port configuration in horizontal domain if $f_h^H R_k^h f_h > \alpha_1 \cdot f_v^H R_k^v f_v$, where $\alpha_1$ is a scale factor. The scale factor $\alpha_1$ may be used to bias the tuning of the user-specific port configuration in a specific direction (i.e., either horizontal or vertical direction). According to an embodiment, adaptively configuring user-specific ports comprises selecting a user-specific port configuration in vertical domain if $f_h^H R_k^h f_h < \alpha_1 \cdot f_v^H R_k^v f_v$.

As the skilled person understands, the equations of these embodiments are only provided as examples, and highlights which direction (horizontal or vertical) is most favorable if an optimization goal for the adaptive user-specific beam forming is to increase the beamforming gain, and hence the received power. If an optimization goal for the adaptive user-specific beam forming is to achieve multi-stream transmissions, other criterion, and hence equations, may be formulated.

There may be different ways to select the codebooks (or codebook, if a single codebook is used for both the vertical and horizontal domain). According to an embodiment the beam forming weights $f_h$ and $f_v$ are defined by a codebook specified in the 3rd Generation Partnership Project (3GPP) Release 10. Additionally or alternatively, adaptively configuring user-specific ports comprises selecting a user-specific port configuration for beam forming or spatial multiplexing, where channel conditions support multi-stream transmission, known as spatial multiplexing (or multiple input multiple output, MIMO, communications). Such conditions include sufficient signal strength and the large angular spread to provide independent signal transmission path from network node 11 to the wireless device.

Thus far the methods for adaptive user-specific beam forming have been disclosed for one wireless device 12a. That is, according to an embodiment the adaptive user-specific beam forming is implemented on a per wireless device basis. However, the port configuration may be performed for all wireless devices in a cell (i.e., as served by the network node 11) based on the same type of uplink user-specific spatial channel characteristics. Hence, according to an embodiment the network node 11 is configured to, in a step S102a, acquire uplink user-specific spatial channel characteristics for at least one further wireless device 12b. The user-specific ports of the at least one further wireless device 12b may then be configured. That is, according to this embodiment the network node 11 is configured to, in a step 106a, adaptively configure user-specific ports for the at least one further wireless device 12b by using the uplink user-specific uplink channel statistics for the at least one further wireless device 12a to determine a downlink user-specific port mapping for each at least one further wireless device 12b from the set of downlink port mappings, thereby providing user-specific beam forming for each at least one further wireless device 12b. Thus, by applying the herein disclosed embodiments, the position of the user-specific ports may be adaptively configured to perform user-specific beamforming to each wireless device 12a, 12b.

The network node 11 may adaptively switch between the user-specific ports to perform the user-specific beam forming. Hence, according to an embodiment the network node 11 is configured to, in a step S106b, adaptively switch between the user-specific ports to perform the user-specific beam forming. Thereby a port mapping may be selected in an adaptive manner from several options.

Thus far only a configuration of the user-specific ports has been determined. There may be different ways for the network node 11 to use the configured user-specific ports. According to an embodiment the network node 11 is configured to, in a step S108, transmit signals to each wireless device 12a, 12b using the respective user-specific ports.

In summary, at least some of the herein disclosed embodiments are based on exploiting the uplink user-specific spatial channel characteristics, such as long-term channel statistics, from each wireless device 12a, 12b to adaptively configure the user-specific ports, such as CSI-RS ports, so that user-specific beamforming can be performed in the dimension (i.e., either azimuth, elevation or both) that has most favourable channel condition. By combining uplink user-specific spatial channel characteristics with a user-specific port mapping on the downlink the precoders in 3GPP Release 10 can be used without modifications since, for each wireless device 12a, 12b, the port configuration will be that of an ULA. This can significantly improve the beamforming gains with which the wireless devices 12a, 12b are served.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for adaptive user-specific beam forming, the method being performed by a network node, the method comprising:
   the network node acquiring uplink user-specific spatial channel characteristics for a wireless device;
   the network node acquiring a set of downlink port mappings for the wireless device; and
   the network node adaptively configuring user-specific ports for the wireless device, wherein
   the uplink user-specific spatial channel characteristics for wireless device k are represented by a covariance matrix, $R_k$, and
   the network node adaptively configuring user-specific ports comprises:
      the network node utilizing the uplink-user specific spatial channel characteristics to determine: (i) a codebook entry specifying beam forming weights $f_h$ for horizontal user-specific beam forming, and (ii) a codebook entry specifying beam forming weights $f_v$ for vertical user-specific beam forming, wherein $f_h$ and $f_v$ are determined such that signal strengths expressed as $f_h^H R_k^h f_h$ and $f_v^H R_k^v f_v$ are maximized, respectively, and wherein $f_h^H$ is a conjugate transpose of $f_h$ and $f_v^H$ is a conjugate transpose of $f_v$.

2. The method according to any claim 1, wherein the spatial channel characteristics are long-term channel statistics.

3. The method according to claim 1, wherein the spatial channel characteristics relate to at least one of a direction of arrival for radio waves received at the network node, channel correlation or covariance matrices determined from uplink measurements, and signal strength estimates over multiple antenna elements or beam forms.

4. The method according to claim 1, wherein the spatial channel characteristics are obtained based on measurements on a received signal, wherein the received signal comprises sounding reference signals, SRS.

5. The method according to claim 1, wherein the user-specific ports are ports of an active antenna array.

6. The method according to claim 5, wherein the set of downlink port mappings is defined by dividing the active antenna array into at least two subarrays.

7. The method according to claim 6, wherein the user-specific ports are implemented by combining at least two subarrays ports.

8. The method according to claim 1, wherein the user-specific ports are used for transmitting user-specific reference signals.

9. The method according to claim 8, wherein characteristics of the user-specific ports are adaptively configured to perform the user-specific beam forming.

10. The method according to claim 8, further comprising:
    adaptively switching between the user-specific ports to perform the user-specific beam forming.

11. The method according to claim 1, wherein the downlink user-specific port mapping is used for user-specific beam forming in horizontal direction when the spatial channel characteristics are more favorable in the horizontal direction than in vertical direction.

12. The method according to claim 1, wherein the downlink user-specific port mapping is used for user-specific beam forming in vertical direction when the spatial channel characteristics are more favorable in the vertical direction than in horizontal direction.

13. The method according to claim 1, wherein the adaptively configuring user-specific ports comprises selecting a user-specific port configuration in horizontal domain when $f_h^H R_k^h f_h > \alpha_1 \cdot f_v^H R_k^v f_v$, where $\alpha_1$ is a scale factor.

14. The method according to claim 1, wherein the adaptively configuring user-specific ports comprises selecting a user-specific port configuration in vertical domain when $f_h^H R_k^h f_h > \alpha_1 \cdot f_v^H R_k^v f_v$, where $\alpha_1$ is a scale factor.

15. The method according to claim 1, wherein $f_h$ and $f_v$ are defined by a codebook specified in 3rd Generation Partnership Project, 3GPP, Release 10.

16. The method according to claim 1, wherein the adaptively configuring user-specific ports comprises selecting a user-specific port configuration for beam forming or spatial multiplexing.

17. The method according to claim 1, further comprising:
    transmitting signals to the wireless device using the user-specific ports.

18. The method according to claim 1, further comprising:
    acquiring uplink user-specific spatial channel characteristics for at least one further wireless device; and
    the adaptively configuring user-specific ports for said at least one further wireless device by utilizing the uplink user-specific uplink channel statistics for the at least one further wireless device to determine downlink user-specific port mappings for each at least one further wireless device from the set of downlink port mappings.

19. A network node for adaptive user-specific beam forming, the network node comprising a processing unit, the processing unit being configured to cause the network node to:
    acquire uplink user-specific spatial channel characteristics for a wireless device;
    acquire a set of downlink port mappings for the wireless device; and
    adaptively configure user-specific ports for the wireless device, wherein
    the uplink user-specific spatial channel characteristics for wireless device k are represented by a covariance matrix, $R_k$, and
    the adaptively configured user-specific ports comprises:

the uplink-user specific spatial channel characteristics to determine: (i) a codebook entry specifying beam forming weights $f_h$ for horizontal user-specific beam forming, and (ii) a codebook entry specifying beam forming weights $f_v$ for vertical user-specific beam forming, wherein $f_h$ and $f_v$ are determined such that signal strengths expressed as $f_h^H R_k^h f_h$ and $f_v^H R_k^v f_v$ are maximized, respectively, and wherein $f_h^H$ is a conjugate transpose of $f_h$ and $f_v^H$ is a conjugate transpose of $f_v$.

20. A computer program stored on a non-transitory computer readable medium for adaptive user-specific beam forming, the computer program comprising computer code which, when run on a processing unit of a network node, causes the network node to:

acquire uplink user-specific spatial channel characteristics for a wireless device;

acquire a set of downlink port mappings for the wireless device; and adaptively configure user-specific ports for the wireless device, wherein the uplink user-specific spatial channel characteristics for wireless device k are represented by a covariance matrix, $R_k$, and the adaptively configured user-specific ports comprises:

the uplink-user specific spatial channel characteristics to determine: (i) a codebook entry specifying beam forming weights $f_h$ for horizontal user-specific beam forming, and (ii) a codebook entry specifying beam forming weights $f_v$ for vertical user-specific beam forming, wherein $f_h$ and $f_v$ are determined such that signal strengths expressed as $f_h^H R_k^h f_h$ and $f_v^H R_k^v f_v$ are maximized, respectively, and wherein $f_h^H$ is a conjugate transpose of $f_h$ and $f_v^H$ is a conjugate transpose of $f_v$.

\* \* \* \* \*